United States Patent [19]

Frommelt et al.

[11] Patent Number: 4,873,800
[45] Date of Patent: Oct. 17, 1989

[54] LOADING DOCK SEAL

[75] Inventors: John A. Frommelt, Dubuque, Iowa; Kenneth Lenz, East Dubuque, Ill.

[73] Assignee: Frommelt Industries, Inc., Dubuque, Iowa

[21] Appl. No.: 151,874

[22] Filed: Feb. 3, 1988

[51] Int. Cl.$^4$ .............................................. E04H 14/00
[52] U.S. Cl. ................................................. 52/173 DS
[58] Field of Search ..................................... 52/173 DS

[56] References Cited

U.S. PATENT DOCUMENTS

| | | |
|---|---|---|
| 2,892,463 | 6/1959 | Frommelt et al. . |
| 3,181,205 | 5/1965 | Frommelt et al. . |
| 3,352,314 | 11/1967 | Frommelt et al. . |
| 3,403,489 | 10/1968 | Frommelt et al. . |
| 3,500,599 | 3/1970 | Sciolino . |
| 3,875,954 | 4/1978 | Frommelt et al. . |
| 4,359,846 | 11/1982 | Votteler ......................... 52/173 DS |

Primary Examiner—Carl D. Friedman
Attorney, Agent, or Firm—Emrich & Dithmar

[57] ABSTRACT

A loading dock seal includes a pair of facing sealing members attached to respective opposed edges of a wall which define a portion of an opening therein. Each sealing member includes a plurality of nonlinear, flexible, resilient leaf springs each inserted within a respective pocket of an outer fabric cover in a spaced manner along the length of the sealing member and oriented generally horizontally. Each leaf spring is mounted to an edge of the wall defining a side of the opening therein and extends outward from the wall and away from the aperture in the wall. Each of the sealing members further includes a generally vertically oriented stabilizer bar extending substantially its entire length. A handle located on an inner surface of each of the sealing members allows the flexible sealing member to be pulled inwardly toward the center of the aperture whereupon the leaf springs engage an aft edge of a lateral panel of the vehicle in position in front of the opening in the wall. Further inward displacement of the sealing members causing additional bending of the leaf springs allows the sealing members to clear the aft edge of the vehicle's lateral panel. Upon release of the handle, the leaf springs urge the sealing member into tight-fitting engagement with an inner portion of the vehicle's side panel so as to form a seal between the wall and the vehicle's lateral panel.

15 Claims, 2 Drawing Sheets

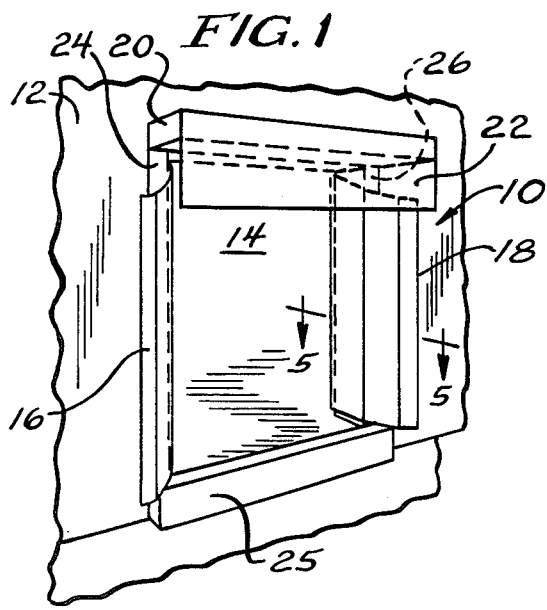
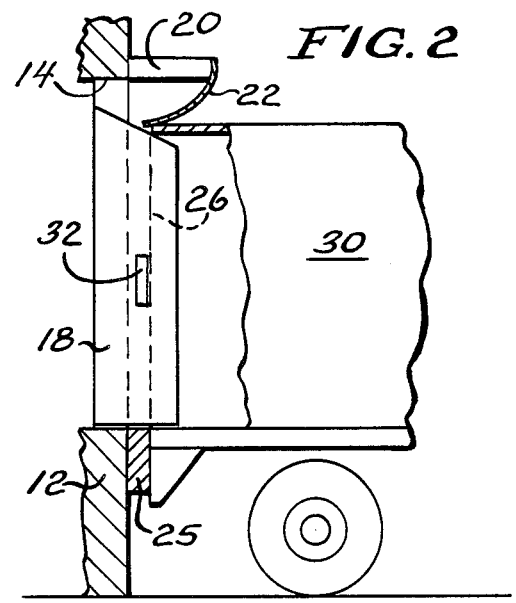
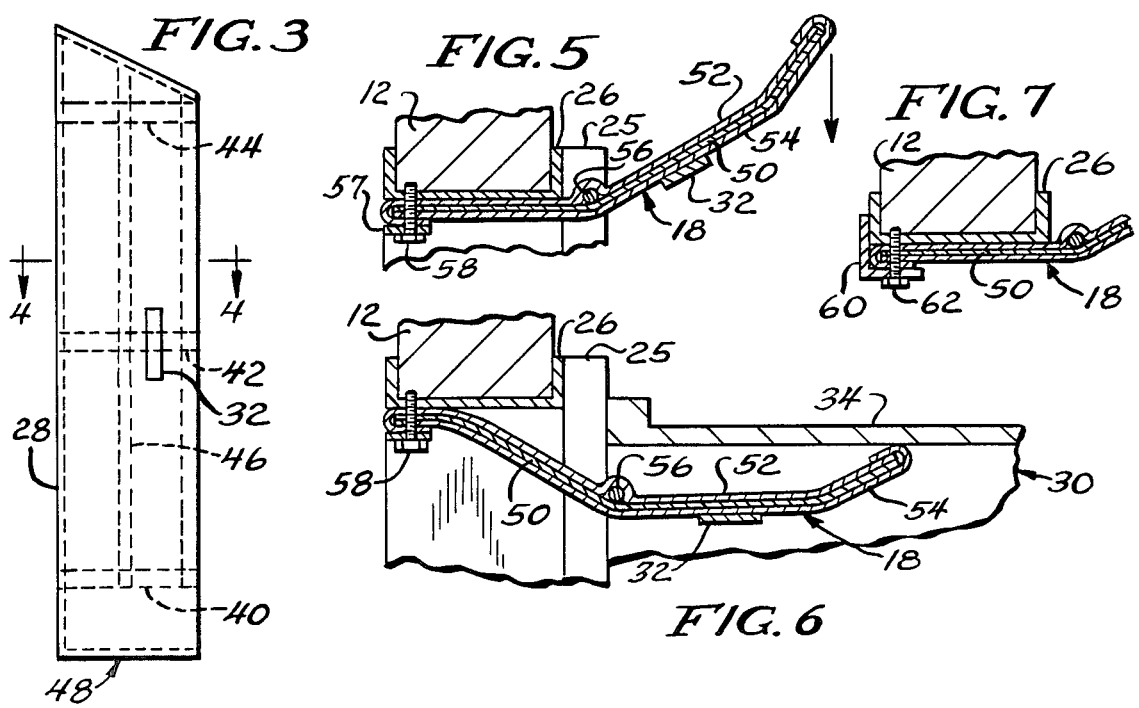
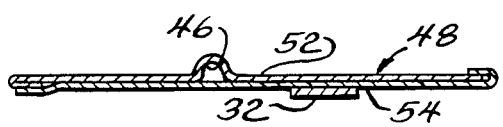

LOADING DOCK SEAL

BACKGROUND OF THE INVENTION

This invention relates generally to loading dock shelters and is particularly directed to an arrangement for providing a seal between an aft lateral edge of a vehicle and an opening in a wall to which is mounted a loading dock shelter to facilitate loading/unloading of the vehicle.

A vehicle such as a truck is generally placed in close proximity to a door opening in a building wall to facilitate the loading or unloading of the vehicle. The aft end of the vehicle generally extends into or in close proximity to the opening which usually has a greater width than that of the vehicle so that vehicles of different widths can be easily backed into operative relation to the door opening. With a door opening wider than the width of the vehicle, the gap therebetween exposes the inside of the building to the elements outside. To isolate the building's inside from the outside elements, the opening in the building's wall is provided with a structure known as a loading dock shelter.

Loading dock shelters are generally classified into two different types: (1) those embodying resilient, compressible pad members, and (2) those making use of fabric or sheet material so as to form walls or curtains. The resilient pad members of the former type are generally disposed adjacent to respective lateral edges of the aperture in the wall and are adapted to engage rear edges of walls of the vehicle. The width of these pads allows this type of dock shelter to accommodate vehicles of various widths. Examples of this type of dock shelter can be found in U.S. Pat. Nos. 3,181,205 to Frommelt et al and 3,500,599 to Sciolino.

In the latter type of dock shelter mentioned above, a retractable supporting frame provides support for the curtains and protection for the dock shelter structure by permitting the dock shelter to be retracted as the vehicle is backed into position in preventing damage to the dock shelter. Examples of this type of dock shelter employing a yieldable frame can be found in U.S. Pat. Nos. 2,892,463 and 3,352,314 to Frommelt et al.

A variation on the second type of dock shelter discussed above includes a rigid frame with cover members disposed thereon to be yieldably held in sealing engagement with the top and sides of a vehicle positioned in cooperative engagement with the dock shelter. A loading dock shelter of this type is disclosed in our U.S. Pat. No. 3,403,489. U.S. Pat. No. 3,875,954 to Frommelt et al is also of the type having a rigid frame with cover members engaging the aft edges of a vehicle in a yieldable manner. Each of the side sections of the elongated side walls of this loading dock seal flare outwardly from each other in a transverse direction for yieldingly engaging adjacent aft edges of a vehicle's door panels and side walls to fill the gap therebetween and prevent the passage of air into and out of the building between these two portions of the vehicle while the vehicle is being loaded or unloaded.

The present invention is a novel seal for use in a loading dock shelter which is adapted for use with vehicles having a wide range of widths, is stored in a nonuse position to prevent contact with a moving vehicle and possible damage to the dock seal, is easily movable by hand to the use, vehicle engaging position, and provides an impervious seal between the lateral panels of the vehicle and facing portions of a building wall to which the dock seal is mounted so as to prevent air flow into or out of the building.

OBJECTS AND SUMMARY OF THE INVENTION

Accordingly, it is an object of the present invention to provide an improved seal for a loading dock shelter.

It is another object of the present invention to provide an improved sealing arrangement for a loading dock shelter by preventing leakage between the open door panels and adjacent side walls of a vehicle using the loading dock shelter.

A further object of the present invention is to provide an improved seal for use in a loading dock shelter which is manually positioned in sealing engagement with the side panels of a vehicle.

Yet another object of the present invention is to provide a novel seal for a loading dock shelter which functions in an efficient and practical manner, is easily and economically fabricated, and is adapted for operation with vehicles of various widths.

The present invention contemplates a seal in a loading dock shelter for use with a vehicle having a pair of facing, generally vertical side panels each having a respective rear edge portion. The seal includes a plurality of flexible, resilient members each having a respective distal end and a proximal end which is mounted to a wall adjacent to a lateral portion of an opening in the wall. Each resilient member has a generally angled, or curved, shape and extends outward from the wall and away from the aperture therein. A fabric cover is disposed over the flexible, resilient members which are mounted to the wall in a spaced manner in vertical alignment. The seal further includes gripping means attached to a surface of the cover facing inwardly toward the opening for allowing the seal to be pulled inwardly toward the center of the opening and across and in contact with a rear edge portion of a side panel of a vehicle positioned adjacent to the opening in the wall. The seal may thus be pulled to a position within the vehicle such that upon release of the gripping means the distal end of the panel formed of the cover and flexible, resilient members engages an inner surface of the vehicle's side panel, with the seal then extending between the vehicle and the wall. This arrangement prevents the flow of air into or out of the building along the vehicle's side panels and particularly through the gap between a side panel and an open door hingedly attached thereto.

BRIEF DESCRIPTION OF THE DRAWINGS

The appended claims set forth those novel features which characterize the invention. However, the invention itself, as well as further objects and advantages thereof, will best be understood by reference to the following detailed description of a preferred embodiment taken in conjunction with the accompanying drawings, where like reference characters identify like elements throughout the various figures, in which:

FIG. 1 is a perspective view shown partially in phantom of a dock shelter incorporating a dock seal in accordance with the present invention.

FIG. 2 is a side view shown partially in phantom of a dock shelter incorporating dock seals in accordance with the present invention, wherein is also illustrated the aft end of the vehicle using the dock shelter;

FIG. 3 is a planar view shown partially in phantom of a cover for a dock seal in accordance with the present invention.

FIG. 4 is a sectional view of the dock seal cover of FIG. 3 taken along sight line 4—4 therein;

FIG. 5 is a horizontal sectional view of the dock seal illustrated in FIG. 1 taken along sight line 5—5 therein;

FIG. 6 is a vertical sectional view illustrating the manner in which the dock seal of the present invention engages the inner surface of a lateral panel of a vehicle in providing a seal between the vehicle and a building wall which includes an aperture in which a loading dock shelter is positioned;

FIG. 7 is a horizontal sectional view illustrating details of the manner in which the dock seal of the present invention may be mounted to a wall;

DETAILED DESCRIPTION OF THE PREFERRED EMBODIMENT

Figure 8:
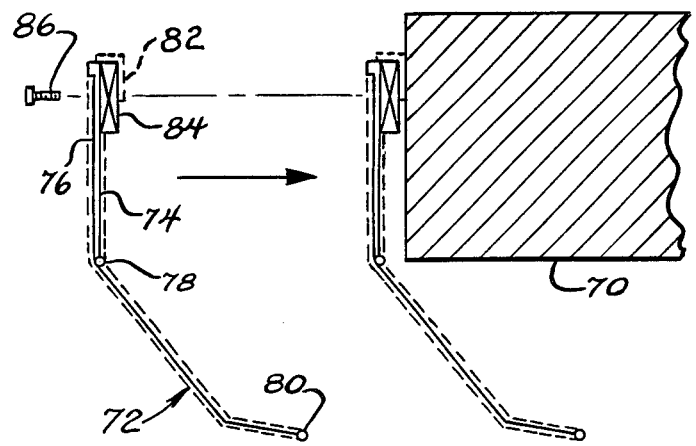
FIG. 8 is a horizontal sectional view illustrating another embodiment of a loading dock seal in accordance with the present invention and the manner in which the dock seal is mounted to a wall adjacent to an opening therein.

Referring to FIGS. 1 and 2, there are respectively shown perspective and side views partially in phantom of a loading dock shelter 10 incorporating a pair of dock seals 16 and 18 in accordance with the present invention. The dock shelter 10 is disposed about an aperture or opening 14 in a wall 12 of a building. FIG. 2 shows a truck or other vehicle 30 in position immediately adjacent to the wall 12 and in front of the opening 14 therein. Goods and material are moved through the opening 14 as they are off loaded or loaded onto the vehicle 30. The loading dock shelter 10 protects the vehicle 30 and the wall 12 from damage arising from contact with one another and provides a seal therebetween in order to isolate the interior of the building from the outside elements during loading/unloading of the truck.

As is conventional, the dock shelter 10 includes a head beam 20 mounted to the wall 12 immediately above the opening 14 therein. Attached to a distal edge of the head beam 20 along the length thereof is a head curtain 22 adapted to engage an upper, aft edge of the vehicle 30 and to close the gap between the upper portion of the vehicle and the wall 12 in preventing the flow of air and other elements through the opening 14 during loading/unloading of the truck. Also mounted to the wall 12 immediately beneath the opening 14 therein is a lower dock bumper 25. The lower dock bumper 25 is adapted to engage a lower, aft edge of the truck 30 and remains in contact therewith to facilitate loading/unloading of the truck.

Referring to FIG. 3, there is shown a planar view of a cover 48 for use in the dock seal of the present invention. A sectional view of the cover 48 illustrated in FIG. 3 taken along sight line 4—4 is shown in FIG. 4. FIG. 5 is a horizontal sectional view of the right dock seal 18 illustrated in FIG. 1 taken along signt line 5—5 therein.

Referring to these figures, details of the structure and function of the dock seal 18 will now be described.

The dock seal 18 includes an outer fabric cover 48 comprised of any of the more conventional materials used in dock shelters such as a nylon treated fabric, vinyl or canvas duck. The cover 48 is provided with a plurality of pockets therein extending across its width and along its length. For example, the cover 48 includes a lower pocket 40, an intermediate pocket 42, and an upper pocket 44. Inserted in the intermediate pocket 42 is a horizontal stabilizer 50. Similar stabilizers are inserted in the lower and upper pockets 40, 44. Each of the horizontal stabilizers 50 is preferably comprised of a high strength, resilient, flexible material such as spring steel, plastic or fiberglass having a generally curvilinear shape and a thin cross section. The cover 48 further includes an elongated, rope-like material sewn into the cover about its periphery as shown in FIG. 3. This rope-like periphery for the cover 48 allows the cover to fit the rail of the vehicle using the loading dock.

The cover 48 further includes one or more generally vertically oriented pockets 46 extending substantially the entire length of the cover. Each of the vertical pockets 46 is adapted to receive a respective vertical stabilizer 56 which is preferably in the form of an enlongated linear tube comprised of a metal such as aluminum. The vertical stabilizer 56 maintains the dock seal 18 in a generally linear configuration and in abutting contact with a lateral panel 34 of a vehicle as shown in FIG. 6 even when the truck is oriented at an angle relative to the lateral edges of the aperture in the wall 12.

As shown in the sectional view of FIG. 4, the cover 48 is preferably comprised of an outer fabric cover 52 and an inner fabric cover 54 where the terms "outer" and "inner" are used relative to the opening in the wall adjacent to which the dock seal is mounted. The outer and inner fabric covers 52, 54 extend the entire length of the dock seal and are coupled together along respective edges thereof by conventional means such as an adhesive or appropriate stitching. Positioned on the inner fabric cover 54 is a gripping means such as a pull handle 32. The handle 32 is adapted for grasping by one positioned in the opening in the wall about which the dock shelter is disposed for pulling the dock seal inwardly as described below. The handle 32 may be in the form of a material strip attached at its upper and lower ends to the inner fabric cover 54 by conventional means such as an adhesive or stitching to permit the handle to be grasped and the entire dock seal to be displaced. While the dock seal cover 48 illustrated in FIG. 4 as well as in the other figures is provided with only a single vertical stabilizer pocket 46, more than one of such pockets may be incorporated in the dock seal for accommodating more than one vertical stabilizer 56 as required depending upon the application or environment in which the dock seal is employed.

As shown in FIG. 5, the dock seal 18 is mounted to the wall 12 by means of a side frame 26 and the combination of an elongated, linear mounting bracket 57 and threaded fastener 58. With the side frame 26 preferably comprised of metal and securely affixed to an inner edge of the wall 12, the threaded fastener 58 is inserted through an aperture in each of the horizontal stabilizers 50 so as to engage the side frame. The threaded fastener 58 thus securely couples the proximal end of the horizontal stabilizer 50 to the wall 12. The flexibility of the horizontal stabilizers 50 allow the distal end portions thereof to be displaced inwardly, or toward the center of the aperture in the wall 12.

The dock seal 18 is shown in the nonuse position in FIG. 5, in which each of the horizontal stabilizers 50 is in its normal, tension-free configuration. FIG. 6 illustrates the dock seal 18 in the use, or vehicle engaging position, wherein each of the horizontal stabilizers 50 is under tension. The dock seal 18 is displaced from the nonuse position illustrated in FIG. 5 to the use position illustrated in FIG. 6 by grasping the handle 32 attached thereto and pulling the dock seal inwardly in the direction of the arrow in FIG. 5 toward the center of the aperture in the wall 12. The dock seal 18 is pulled inwardly with the vehicle 30 positioned in abutting contact with the dock shelter's lower bumper 25 as shown in FIG. 6. The flexibility of each of the horizontal stabilizers 50 permits the dock seal 18 to be drawn toward the center of the aperture in the wall 12 through the gap between the outer surface of the wall and the aft edge of the vehicle's side panel 34. With the dock seal 18 pulled inwardly between the wall 12 and the vehicle's side panel 34 and thus positioned within an aft portion of the vehicle 30, the pull handle 32 is then released, with the distal end portion of the dock seal allowed to engage the inner surface of the side panel. With the dock seal 18 thus extending between the wall 12 and the vehicle side panel 34, the dock seal prevents the flow of air through the space between the wall and an aft, lateral portion of the vehicle in isolating one side of the wall from the other side of the wall during loading/unloading of the vehicle. After loading/unloading of the vehicle, the vehicle is then moved away from the dock shelter allowing the dock seal 18 to assume its untensed, nonuse configuration as shown in FIG. 5.

Referring to FIG. 7, there is shown another arrangement for mounting the dock seal 18 to an edge of a wall 12 defining an opening therein. In the mounting arrangement of FIG. 7, an L-shaped mounting bracket 60 is positioned in contact with the distal edge of the dock seal 18 along the length thereof. A threaded fastener 62 is then inserted through the L-shaped mounting bracket 60 as well as through each of the horizontal stabilizers 50 for secure fastening to the side frame 26. By thus securely attaching the distal end of each of the horizontal stabilizers 50 to the wall 12 using the combination of the L-shaped mounting bracket 60 and a plurality of threaded mounting bolts or fastening pins 62, the dock seal 18 may be securely attached to the wall 12 along its entire length.

Referring to FIG. 8, there is shown another embodiment of a dock seal 72 in accordance with the principles of the present invention. In the embodiment of FIG. 8, the dock seal 72 includes a short stabilizer 74 and a long stabilizer 76. The long stabilizer 76 is preferably comprised of a single piece and has several angled portions allowing the dock seal to extend outwardly from an aperture in a wall 70. The proximal, linear portion of the long stabilizer 76 is positioned in contact with the short stabilizer 74 which extends only to the outer surface of the wall 70. The dock seal 72 is provided with a fabric cover 82 shown in dotted line form in FIG. 9. Each of the short and long stabilizers 74, 76 is mounted to the wall 70 by means of a mounting frame member 84 and a threaded fastener 86. The mounting frame member 84 is attached to an edge of the wall 70 defining an opening therein by conventional means such as mounting bolts (not shown). The threaded fastener 86 is then inserted through the distal end of the combination of the short and long stabilizers 74 and 76 for attaching these stabilizers to the mounting frame member 84. The mounting frame member 84 is preferably comprised of an elongated, linear section of wood. The manner in which the dock seal 72 is mounted to the wall 70 by the combination of a plurality of spaced threaded fasteners 86 and the mounting frame 84 is illustrated in FIG. 8 by the direction of the arrow shown therein. The cover 82 is provided with a plurality of pockets therein for receiving an intermediate vertical stabilizer 78 as well as a distal vertical stabilizer 80 which also functions as a leading edge seal. The distal vertical stabilizer 80 may be provided with a plurality of spaced slots along its length, with each slot adapted to receive the distal end of a respective long stabilizer 76. The intermediate and distal vertical stabilizers 78, 80 are preferably comprised of aluminum tubing, while the short and long stabilizers 74, 76 are preferably comprised of spring steel leafs. The short and long stabilizers 74, 76 urge the dock seal 72 outwardly for engaging the inner surface of a side panel of a vehicle, while the intermediate and distal vertical stabilizers 78, 80 maintain the dock seal in a linear configuration along the length thereof for engaging the vehicle's side panel along its entire length. Longer stabilizers 76 may be used where the width of vehicles using the loading dock is substantially less than the width of the opening in the wall.

Figure 9:
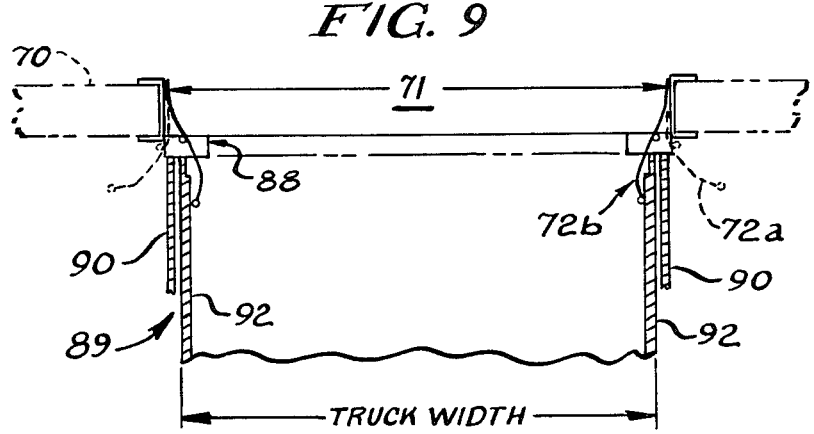
FIG. 9 is a horizontal sectional view illustrating the vehicle engaging and nonengaging positions of a pair of loading dock seals in accordance with the present invention.

Referring to FIG. 9, there is shown a vehicle 89 having a pair of facing, spaced lateral panels 92 each having a door 90 pivotally mounted to an aft edge thereof by hinge means (not shown). The truck is typically backed into position adjacent to the aperture 71 within the wall 70 and in contact with a dock bumper, or bumpers, 88 mounted to an outer surface of the wall. The right and left dock seals are shown extending outwardly from the aperture 71 within the wall 70 and away from the side panels 92 of the vehicle 89. The right dock seal in the nonuse, untensed configuration is shown in dotted line form as element 72a. Each of the dock seals is moved into position by grasping its respective pull handle on an inner surface thereof as described above and drawing it between adjacent portions of the wall 70 and aft edge of a side panel of the vehicle. Once drawn through the gap between the wall and an aft edge of the vehicle's side panel, the flexibly resilient dock seal is released allowing it to engage an inner surface of an adjacent side panel of the vehicle. The right dock seal 72b is shown engaging an inner surface of the vehicle's right side wall 92 in the figure. The flexibility of each of the dock seals allows them to be drawn through the relatively narrow gap between an aft edge of the vehicle s side panel and adjacent outer portion of the wall 70. It can also be seen from FIG. 9 that the dock seal of the present invention also seals off the gap between a side panel 92 of the vehicle and its attached open door 90 from the inside of the building and prevents air flowing through this gap from passing through the opening 71 in the wall 70.

Figure 10:
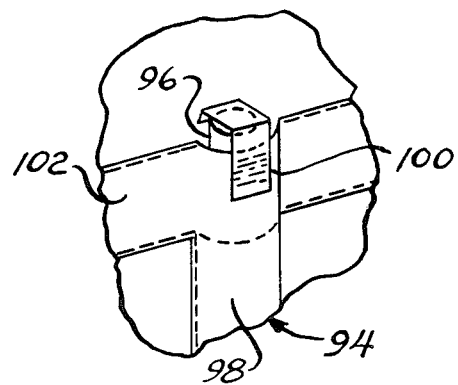
FIG. 10 is a perspective view illustrating the details of the manner in which a reinforcing member may be positioned in and coupled to the loading dock seal of the present invention.

Referring to FIG. 10, there is shown a perspective view partially in phantom of the manner of inserting and retaining a vertical stabilizer 96 in the cover 94 of a dock seal in accordance with the present invention. The dock seal cover 94 includes an upper horizontal stabilizer pocket 102 adapted to receive a horizontal stabilizer as previously described. The dock seal cover 94 also includes a vertical stabilizer pocket 98 extending downward from the horizontal stabilizer pocket 102 and adapted to receive a vertical stabilizer 96. To the upper end of the vertical stabilizer 96 is attached a piece of Velcro which is adapted for contact with and coupling to a complementary piece of Velcro attached to an outer surface of the dock seal cover 94 adjacent to where the vertical stabilizer is inserted in the pocket 98. The Velcro fastener 100 thus maintains the vertical stabilizer 96 in position in the vertical stabilizer pocket 98 within the dock seal cover 94.

There has thus been shown a dock seal for a loading dock shelter which is easily movable by hand between a nonuse and a use position, wherein the loading dock seal engages an inner portion of a side panel of a vehicle for sealing off the gap between an aft lateral portion of the vehicle and the wall on which the loading dock shelter is mounted. By thus positioning the dock seal in contact with an inner portion of the vehicle's side panel, an inner portion of a building which includes the wall is also isolated from air flow between the side panel of the truck and an open door hingedly mounted thereto. The dock seal of the present invention is inexpensively fabricated, easily mounted to facing sides of an aperture in a wall in forming a portion of a loading dock shelter, and easily moved by hand from a nonuse position, wherein it is positioned so as not to be contacted by a vehicle backing up into position adjacent to the dock shelter, to a vehicle engaging use position.

While particular embodiments of the present invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

I claim:

1. A seal for use with a vehicle having a pair of facing, generally vertical side panels having rear edge portions, said seal comprising:
   a plurality of flexible, resilient members each having a distal end and a proximal end mounted to a wall in a spaced manner adjacent to a lateral portion of an opening in said wall and extending outward from said wall and away from the opening therein when not in use;
   a cover disposed over and encompassing said flexible, resilient members;
   at least one generally vertically oriented reinforcing member extending substantially the entire length of said seal, wherein said at least one generally vertically oriented reinforcing member is disposed in a spaced manner from the proximal end of each of said flexible, resilient members; and
   gripping means attached to said cover and facing the opening in the wall for allowing said seal to be pulled inwardly toward the opening and into an aft portion of the vehicle such that upon release of said gripping means the distal end of said flexible, resilient members ergages an inner portion of said side panel and said send extends between the vechicle and the wall.

2. The seal of claim 1 wherein said at least one generally vertically oriented reinforcing member is disposed in a spaced manner from the distal end of each of said flexible, resilient members.

3. The seal of claim 2 further comprising first and second reinforcing members respectively positioned in intermediate and distal portions of said cover.

4. The seal of claim 2 wherein said at least one reinforcing member is comprised of an elongated, linear tube.

5. The seal of claim 4 wherein said elongated, linear tube is comprised of metal.

6. The seal of claim 4 wherein said elongated, linear tube is comprised of a high strength plastic or fiberglass.

7. The seal of claim 1 wherein said cover includes an elongated, linear pocket for receiving and maintaining in position said at least one reinforcing member.

8. The seal of claim 1 wherein each of said flexible, resilient members has a generally angled, arcuate shape curving outwardly away from the opening in the wall.

9. The seal of claim 1 wherein each of said flexible, resilient members is a leaf spring comprised of steel.

10. The seal of claim 1 wherein each of said flexible, resilient members is a leaf spring comprised of a high strength plastic or fiberglass.

11. The seal of claim 1 wherein said cover includes a plurality of spaced pockets each adapted for receiving and engaging a respective flexible, resilient member.

12. The seal of claim 1 wherein each of said flexible, resilient members comprises a first longer arcuately angled leaf spring having a linear portion and a second straight leaf spring positioned in abutting contact with the linear portion of said first leaf spring, wherein said first and second leaf springs are securely attached to an edge of the wall defining a lateral portion of the opening therein.

13. The seal of claim 1 wherein said cover is comprised of a nylon treated fabric.

14. The seal of claim 1 wherein said cover is comprised of vinyl.

15. The seal of claim 1 wherein said cover is comprised of canvas duck.

* * * * *